United States Patent [19]

Hashimoto et al.

[11] Patent Number: 4,874,153
[45] Date of Patent: Oct. 17, 1989

[54] PROCESS FOR PRODUCING CERAMIC PRODUCTS USING THE SLUDGE OBTAINED BY SEWAGE TREATMENT

[75] Inventors: Ryusuke Hashimoto, Niwa; Mitsuru Iwata, Kani, both of Japan

[73] Assignee: Fujimi Tile Co., Ltd., Nagoya, Japan

[21] Appl. No.: 71,273

[22] PCT Filed: Oct. 23, 1986

[86] PCT No.: PCT/JP86/00536
§ 371 Date: Aug. 13, 1987
§ 102(e) Date: Aug. 13, 1987

[30] Foreign Application Priority Data

Oct. 24, 1985 [JP] Japan ................................ 60-238170
Jan. 27, 1986 [JP] Japan .................................. 61-15079

[51] Int. Cl.⁴ ............................................. C04B 35/64
[52] U.S. Cl. ...................................... 264/63; 264/56; 501/155
[58] Field of Search ...................... 264/56, 63; 501/155

[56] References Cited

U.S. PATENT DOCUMENTS

| | | | |
|---|---|---|---|
| 338,465 | 3/1886 | Bayer et al. | 264/DIG. 39 |
| 395,590 | 1/1889 | Sattler | 264/DIG. 39 |
| 1,569,251 | 1/1926 | Austin | 264/DIG. 39 |
| 4,112,033 | 9/1978 | Lingl et al. | 264/56 |
| 4,370,285 | 1/1983 | Plück | 264/65 |

FOREIGN PATENT DOCUMENTS

| | | |
|---|---|---|
| 4747472 | 4/1969 | Japan . |
| 49107970 | 2/1973 | Japan . |
| 5117206 | 8/1974 | Japan . |
| 58161965 | 2/1982 | Japan . |

OTHER PUBLICATIONS

Baba et al., Technology for Producing Aggregate of Sludge Ash Through a Sinterning Process in a Sinter--band Furnace (Report of the 21st Lecture Meeting for the Study of Sewage).
News Article, Chunichi Shimbun, Jan. 10, 1986.

Primary Examiner—James Derrington
Attorney, Agent, or Firm—Lahive & Cockfield

[57] ABSTRACT

The invention provides a process for producing ceramic products using, as one of the materials, the sludge obtained by sewage treatment. The invention thus not only makes the sludge treatment unnecessary, but makes the sludge useful as a material for products. A plastic ceramic raw material and, if required, another raw material are added to either the sludge or the ashes obtained by burning the sludge, so as to prepare a body. The body thus obtained is molded into a desired shape, and fired to produce a ceramic product. The firing process prevents the product, containing the sludge, from emitting an offensive odor or being decomposed. The product may be used as a tile, brick block, or the like. Production conditions such as the proportion of each raw material used and the like may be suitably selected to obtain a ceramic product with a desired characteristic in respect of water permeability, from almost no permeability to a very high permeability. The ceramic product with a selected water permeability may be used, for example, for pavement of a road.

6 Claims, 1 Drawing Sheet

PROCESS FOR PRODUCING CERAMIC PRODUCTS USING THE SLUDGE OBTAINED BY SEWAGE TREATMENT

FIELD OF THE ART

This invention relates to processes for producing ceramic products using, as one of the materials, the sludge obtained by sewage treatment.

BACKGROUND OF THE ART

Although the sludge obtained by sewage treatment is sometimes used as a compost, its most frequent use is for land reclamation. The soil containing the sludge has heavy metals and emits an offensive odor and may be decomposed, because of the presence of the sludge. Such problems may be solved by burning the sludge to ashes and using the ashes for land reclamation. However, this entails no small cost because fuel is required for the burning of the sludge.

DISCLOSURE OF THE INVENTION

A process for producing ceramic products according to the invention has been developed to solve the above-mentioned problems. The process according to the invention employs either the sludge obtained by sewage treatment or the ashes obtained by burning the sludge, as one of the materials used for producing ceramic products, such as porcelain, stoneware or chinaware (for example, floor tiles, paving tiles, tiles for interior or exterior finish, and the like). To the more exact, according to the invention, plastic ceramic raw materials and the like are added to either the sludge obtained by sewage treatment or the ashes obtained by burning the sludge, so that a ceramic mix, or a body, is prepared, and then the ceramic mix is formed to the desired shape and is fired to a finished product.

PERFORMANCE

Either the sludge obtained by sewage treatment or the ashes obtained by burning the sludge is used as an ingredient to prepare a formable or moldable powdered ceramix mix. The ceramic mix is formed to the desired shape, and is fired into a solid state. During the burning, the organic substances in the sludge contained in the molding are removed.

BRIEF DESCRIPTION OF THE DRAWINGS

The drawings illustrate an embodiment of the invention.

(Designations by numerals in the drawings)

Figure 1:
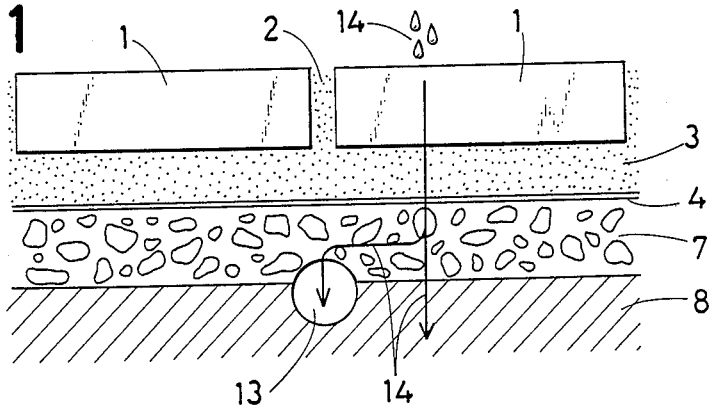
FIGS. 1 to 3 each show the pavement of a road with water-permeable flooring materials in a vertical cross section.

| | |
|---|---|
| 1 | water-permeable flooring materials |
| 2 | joint (coarse river sand) |
| 3 | cushion layer |
| 4 | nonwoven fabric |
| 5 | mortar layer on which the flooring materials 1 are bonded |
| 6 | layer of crushed stone for mechanical stabilization |
| 7 | crusher-run layer |
| 8 | roadbed |
| 9 | water-permeable block of brick or similar material |
| 10 | water-permeable flooring materials |
| 11 | mortar layer on which the flooring materials 10 are bonded |
| 12 | concrete |
| 13 | water-permeable pipe |

-continued

| | |
|---|---|
| 14 | arrow to indicate how rainwater passes through the construction illustrated |
| 15 | arrows to indicate gradients and their directions |

THE BEST EMBODIMENT OF THE INVENTION

The best embodiment of the invention will now be described. To start with, either a cake produced by compressing the raw sludge obtained by precipitation of the solid constituents of sewage during treatment thereof, into a plate-shaped substance which has a moisture content of about 70 weight percent water and therefore may be held with the hand, or one obtained by drying such a plate-shaped substance, is prepared. The latter sludge cake, or the dried sludge cake, may be a high-molecular one or a calcareous one. If the dried sludge cake is a high-molecular one, it contains about 75 percent combustible material, and has a calorific value of about 4,700 kcal/kg. Also, if the dried sludge cake is a high-molecular one, it dissolves at around 1,050° C. during a firing process which will be hereinafter described, and if it is a calcareous one, it dissolves at around 1,200° C. during the firing process.

The sludge cake, whether it is a dried one or not, is mixed with a well-known plastic ceramic raw material or materials and, if necessary, aggregate to prepare a body to be molded into a ceramic product. This mixing may be made in a wet- or dry-process. Wet-process mixing is made as follows: The sludge cake and the foregoing materials are wet ground together in a ball mill, using water, so as to produce a slurry with a concentration of from 50 to 60%. Then the slurry is dehydrated with a filter press so as to a body cake, and the body cake is dried to such a moisture content that the body cake has a good moldability. The dried body cake is reduced to powder. The slurry may be dried with a spray dryer, instead of being dehydrated with a filter press, so as to obtain a powdered body. On the other hand, a dry-process mixing is made after giving the materials (to be mixed) such an amount of moisture that the whole material, upon mixing, will have a moisture content suitable for molding the material. Therefore the dry-process mixing does not call for a subsequent drying thereof as required in the case of the wet-process mixing. After mixing, the material is reduced to powder.

The powdered body is molded, or pressed, into a desired shape. Then, the molding thus obtained is fired in a kiln, thereby producing ceramic products, such as porcelain, stoneware or chinaware (for example, floor tiles, paving tiles, tiles for interior or exterior finish, and the like). Usually, the body is fired at a temperature of from 1,150° to 1,300° C. when producing porcelains or stoneware. However, according to the invention, since the foregoing sludge is employed as an ingredient of the body, such products may be obtained by firing the body at a relatively low temperature of 1,050° to 1,200° C. Also, if the previously-mentioned cake of raw sludge with a large moisture content is used as one of the initial materials, the organic substances contained in the sludge are removed during firing of the molded body, so that the product obtained thereby is free from an offensive odor or possibility of decomposition.

Clay may be used as an additional plastic ceramic raw material to provide a body. This can be done as follows: After mixing the previously-mentioned sludge cake, dried or not dried, with powdered ceramic raw material (and, if required, aggregate) in a dry process (i.e., dry-process mixing), 5 to 20% by dry weight of clay reduced to slurry in a ball mill or an agitator is added to the mixture. An advantage of the use of such an additional material is that the material (clay) may act as a binder to help wet and granulate the entire ceramic material, thus reducing the cost as well as saving the energy for preparation of the ceramic mix.

Also, the ashes obtained by burning raw sludge, instead of the previously-mentioned sludge cake, may be mixed with a plastic ceramic raw material or materials. The ashes of raw sludge may be obtained from a sewage treatment plant. The ashes of raw sludge (high-molecular ashes) are fine, yellowish brown particles which start to dissolve at around 1,050° C. About 90% of the particles are 40 microns or smaller in size, and 50 to 60% of the particles have sizes ranging from 5 to 20 microns. Such a material, therefore, needs no grinding, but may be used, as it is, as one of the ceramic materials. Also, such a material does not emit an offensive odor nor is decomposed, thus ensuring favorable environments of operations such as mixing of the material with the plastic ceramic raw material to prepare a body or molding of the body.

As previously mentioned, if necessary, the previously-mentioned sludge cake may be mixed not only with a plastic ceramic raw material or materials, but with aggregate. And if the aggregate used is one which will keep its original shape almost completely at temperatures at which the sludge and other ingredients dissolve, the uniform distribution of the aggregate in the molded ceramic mix may minimize a reduction of the volume (i.e., shrinkage) of the entire molding as caused by the reduction of the volume of the sludge and other (finely powdered) ingredients thereof in the firing process. Therefore, if such aggregate is used, the production of ceramics may be stabilized with regard to the dimensions and shapes thereof. On the other hand, if a recess or recesses are formed on the surface of the product due to the reduction of the volume of the sludge and other ingredients of the molding in the firing process, such recesses may prevent an object from slipping on the product. This is an advantage, especially where the product is used as a paving material.

Also, the kind, amount and particle size of aggregate, the particle sizes of the other ingredients, and production conditions such as molding pressure and the like may be so selected and combined with one another that the reduction of volume of the finely powdered ingredients of the molding due to dissolution thereof (in the firing process of the molding) will bring about open cells or pores in the product. Such a product may have an excellent water permeability, and thus is particularly suitable as a material for a water-permeable or porous pavement.

Reference will now be made to examples of the invention.

EXAMPLE 1

TABLE 1-1

| Ceramic Raw Materials Used | Parts by Weight | Remarks |
| --- | --- | --- |
| High-molecular dust of raw sludge | 50 | Passed through 20-mesh screen |
| Dust of wall tile | 20 | Produced by dry grinding and collected with a dust |

TABLE 1-1-continued

| Ceramic Raw Materials Used | Parts by Weight | Remarks |
| --- | --- | --- |
| | | collector during the molding process |
| Powdered kibushi clay | 30 | Passed through 100-mesh screen |

Five (5) to six (6) percent of water was added to the ceramic raw materials of Table 1-1, and the whole was mixed together while agitating it and was granulated to prepare a body. Then, using a hydraulic molding machine, the body was molded, under a pressure of 250 kg/cm$^2$, to provide an object with dimensions of 100 mm×100 mm×15 mm. This process was repeated a number of times to provide a number of same moldings. The moldings thus obtained were each fired for 22 hours through a tunnel kiln maintained at a temperature of 1,100° C., so that ceramics with characteristics as shown in Table 1-2 were produced:

TABLE 1-2

| Characteristics | Values of Characteristics |
| --- | --- |
| Bulk specific gravity | 1.10 to 1.15 |
| Water absorption | 18.0 to 19.0% (based on JIS A 5209) |
| Saturation coefficient | 0.6 to 0.7 |
| Bending strength | 50 to 60 kgf/cm$^2$ (based on JIS R 2213) |

The ceramics with the characteristics of Table 1-2 are considered to be useful as lightweight heat-insulating interior materials for buildings. Needless to say, if desired, a frit may be applied to the products so as to give them a glassy finish.

EXAMPLE 2

TABLE 2-1

| Ceramic Raw Materials Used | Parts by Weight | Remarks |
| --- | --- | --- |
| Calcareous dust of raw sludge | 50 | Passed through 20-mesh screen |
| Dust of wall tile | 20 | Produced by dry grinding and collected with a dust collector during the molding process |
| Powdered kibushi clay | 30 | Passed through 100-mesh screen |

Five (5) to six (6) percent of water was added to the ceramic raw materials of Table 1-1, and the whole was mixed together while agitating it and was granulated to prepare a body. Then, using a hydraulic molding machine, the body was molded, under a pressure of 250 kg/cm$^2$, to provide an object with dimensions of 100 mm×100 mm×15 mm. This process was repeated a number of times to provide a number of same moldings. The moldings thus obtained were each fired for 60 minutes through a roller-hearth kiln maintained at a temperature of 1,200° C., so that ceramics with characteristics shown in Table 2-2 were obtained:

TABLE 2-2

| Characteristics | Values of Characteristics |
| --- | --- |
| Bulk specific gravity | 1.20 to 1.25 |
| Water absorption | 5.0 to 7.0% (based on JIS A 5209) |
| Saturation coefficient | 0.3 to 0.4 |
| Bending strength | 90 to 120 kgf/cm$^2$ (based |

TABLE 2-2-continued

| Characteristics | Values of Characteristics |
| --- | --- |
| | on JIS R 2213) |

The ceramics with the characteristics of Table 2-2 are considered to be useful as lightweight heat-insulating interior or exterior materials for buildings. Needless to say, if desired frit may be applied to the products so as to give them a glassy finish.

EXAMPLE 3

Aggregate and fine powdery material as shown in Table 3-1 were mixed together while agitating them, and the mixture was dried and granulated. The grains obtained were sifted through a 8-mesh screen to provide a body. This process was repeated a number of times to provide a number of same bodies.

TABLE 3-1

| Ceramic Raw Materials Used | Ingredients of Each Material | Parts by weight | Remarks |
| --- | --- | --- | --- |
| Aggregate | Pumice | 35 | Passed through 10-mesh screen |
| | Water-granulated aggregate | 30 | Passed through 10-mesh screen |
| Fine Powdery Material | High-molecular ashes obtained by burning sludge | 35 | |
| | Raw kibushi clay | 8 | Contained in a slurry, together with 7 parts of water and 0.1 part of defloccu-lant |

Using a hydraulic molding machine, the bodies obtained were each molded, under a pressure of 200 kg/cm², into an object with dimensions of 100 mm×100 mm×50 mm. The moldings thus obtained were each fired for 22 hours through a tunnel kiln maintained at a temperature of 1,080° C., so that ceramics with characteristics shown in Table 3-2 were produced:

TABLE 3-2

| Characteristics | Values of Characteristics |
| --- | --- |
| 1. Coefficient of water permeability | 2 to 4 × 10⁻² cm/sec (based on JIS A 1218) |
| 2. Water-holding capacity | 5 to 7 l/m² (based on JIS A 5209) |
| 3. Saturation coefficient | 0.2 to 0.4 |
| 4. Surface hardness | Mohs hardness of 6 to 7 |
| 5. Bulk specific gravity | 1.55 to 1.65 |
| 6. Cold resistance | Subjected to a temperature of −20° C. forty (40) times and presented no problems |
| 7. Bending strength | 95 to 110 kgf/cm² (based on JIS R 2213) |
| 8. Skid resistance | 0.9 to 1.0 (based on JIS A 1407) |

The ceramics with the characteristics of Table 3-2 are excellent, particularly in their water permeabilities and nonskid effects, and thus are particularly useful as water-permeable or porous paving tiles.

EXAMPLE 4

Aggregate and fine powdery material as shown in Table 4-1 were mixed together while agitating them, and the mixture was dried and granulated. The grains obtained were sifted through a 6-mesh screen to provide a body. This process was repeated a number of times to provide a number of same bodies.

TABLE 4-1

| Ceramic Raw Materials Used | Ingredients of Each Material | Parts by weight | Remarks |
| --- | --- | --- | --- |
| Aggregate | Water-granulated aggregate | 35 | Passed through 8-mesh screen |
| | Crushed stone | 15 | Graded through 10-mesh and 25-mesh screens |
| | Pottery dust | 15 | Graded through 8-mesh and 25-mesh screens |
| Fine Powdery Material | High-molecular ashes obtained by burning sludge | 35 | |
| | Gairome clay | 12 | Contained in a slurry, together with 15 parts of water and 0.1 part of defloccu-lant |
| | Sludge obtained from sewage in a factory (chiefly including waste frit) | 3 | |

Using a friction molding machine, some of the bodies obtained were each molded, under a pressure of 250 kg/cm², into an object with dimensions of 210 mm×110 mm×60 mm, while the other bodies were each molded, under the same pressure, into an object with dimensions of 300 mm×300 mm×60 mm. All moldings thus obtained were each fired for 22 hours through a tunnel kiln maintained at a temperature of 1,100° C., so that ceramics with characteristics shown in Table 3-2 were produced:

TABLE 4-2

| Characteristics | Values of Characteristics |
| --- | --- |
| 1. Coefficient of water permeability | 4 to 6 × 10⁻² cm/sec (based on JIS A 1218) |
| 2. Water-holding capacity | 9 to 11 l/m² |
| 3. Saturation coefficient | 0.2 to 0.4 |
| 4. Surface hardness | Mohs hardness of 6 to 7 |
| 5. Bulk specific gravity | 1.60 to 1.65 |
| 6. Cold resistance | Subjected to a temperature of −20° C. forty (40) times and presented no problems |
| 7. Bending strength | 40 kgf/cm² or more (based on JIS R 2213) |
| 8. Skid resistance | 0.9 to 1.0 |

It will be appreciated that the ceramics with the characteristics of Table 4-2 are suitable as flooring materials (blocks of brick) used for construction of a road shared by pedestrians and vehicles.

EXAMPLE 5

Aggregate and fine powdery material as shown in Table 5-1 were mixed together while agitating them, and the mixture was dried and granulated. The grains obtained were graded through a 3-mesh screen and a 6-mesh screen, and then the coarse grains and fine grains thus obtained were suitably mixed to provide a body. This process was repeated a number of times to provide a number of same bodies.

TABLE 5-1

| Ceramic Raw Materials Used | Ingredients of Each Material | Parts by Weight | Remarks |
| --- | --- | --- | --- |
| Aggregate | Water-granulated aggregate | 35 | Passed through 8-mesh screen |
|  | Crushed stone | 15 | Graded through 8-mesh and 25-mesh screens |
|  | Pottery dust | 15 | Graded through 8-mesh and 25-mesh screens |
| Fine Powdery Material | High-molecular ashes obtained by burning sludge | 35 |  |
|  | Gairome clay | 12 | Contained in a slurry, together with 15 parts of water and 0.1 part of deflocculant |
|  | Sludge obtained from sewage in a factory (chiefly including waste frit) | 3 |  |

Using a friction molding machine, the bodies obtained were each molded, under a pressure of 250 kg/cm$^2$, into an object with dimensions of 210 mm × 110 mm × 60 mm. The moldings thus obtained were each fired for 22 hours through a tunnel kiln maintained at a temperature of 1,100° C., so that ceramics with characteristics shown in Table 5-2 were produced:

TABLE 5-2

| Characteristics | Values of Characteristics |
| --- | --- |
| 1. Coefficient of water permeability | 7 to 9 × 10$^{-2}$ cm/sec (based on JIS A 1218) |
| 2. Water-holding capacity | 8 to 10 l/m$^2$ |
| 3. Saturation coefficient | 0.2 to 0.3 |
| 4. Surface hardness | Mohs hardness of 6 to 7 |
| 5. Bulk specific gravity | 1.55 to 1.60 |
| 6. Cold resistance | Subjected to a temperature of −20° C. forty (40) times and presented no problems |
| 7. Bending strength | 35 kgf/cm$^2$ or more (based on JIS R 2213) |
| 8. Skid resistance | 0.8 to 1.0 |

It will be appreciated that the ceramics with the characteristics of Table 5-2 are suitable as water-permeable flooring blocks (blocks of brick) for use in an area where water permeability is of especial importance.

EXAMPLE 6

Aggregate and fine powdery material as shown in Table 6-1 were mixed together while agitating them, and the mixture was dried and granulated. The grains obtained were graded by sifting a portion thereof through a 3-mesh screen and the other portion thereof through a 6-mesh screen, and the course grains and fine grains thus obtained were appropriately mixed together to provide a body. This process was repeated a number of times to provide a number of same bodies.

TABLE 6-1

| Ceramic Raw Materials Used | Ingredients of Each Material | Parts by Weight | Remarks |
| --- | --- | --- | --- |
| Aggregate | Pumice | 10 | Passed through 10-mesh screen |
|  | Water-granulated aggregate | 25 | Passed through 8-mesh screen |
|  | Crushed stone | 10 | Graded through 10-mesh and 25-mesh screens |
|  | Pottery dust | 15 | Graded through 8-mesh and 25-mesh screens |
| Fine Powdery Material | High-molecular ashes obtained by burning sludge | 40 |  |
|  | Gairome clay | 10 | Contained in a slurry, together with 15 parts of water and 0.1 part of deflocculant |
|  | Sludge obtained from sewage in a a factory (chiefly containing waste frit) | 3 |  |
|  | High-molecular ashes obtained by burning sludge | 2 |  |

Using a friction molding machine, the bodies obtained as mentioned above were each molded, under a pressure of 250 kg/cm$^2$, into an object with dimensions of 210 mm × 110 mm × 60 mm. Then, the moldings thus obtained were each fired for 22 hours through a tunnel kiln maintained at a temperature of 1,080° C., so that ceramics with characteristics shown in Table 6-2 were produced:

TABLE 6-2

| Characteristics | Values of Characteristics |
| --- | --- |
| 1. Coefficient of water permeability | 6 to 9 × 10$^{-2}$ cm/sec (based on JIS A 1218) |
| 2. Water-holding capacity | 7 to 9 l/m$^2$ |
| 3. Saturation coefficient | 0.2 to 0.3 |
| 4. Surface hardness | Mohs hardness of 6 |
| 5. Bulk specific gravity | 1.55 to 1.65 |
| 6. Cold resistance | Subjected to a temperature of −20° C. forty (40) times and presented no problems |
| 7. Bending strength | 35 kgf/cm$^2$ or more (based |

TABLE 6-2-continued

| Characteristics | Values of Characteristics |
|---|---|
| | on JIS R 2213) |

It will be appreciated that the ceramics with the characteristics of Table 6-2 are suitable as water-permeable flooring materials (blocks of brick) for use in an area where water permeability is of especial importance.

EXAMPLE 7

Aggregate and fine powdery material as shown in Table 7-1 were mixed together while agitating them, and the mixture was dried and granulated. The grains obtained were sifted through a 6-mesh screen to provide a body. This process was repeated a number of times to provide a number of same bodies.

TABLE 7-1

| Ceramic Raw Materials Used | Ingredients of Each Material | Parts by Weight | Remarks |
|---|---|---|---|
| Aggregate | Pumice | 10 | Passed through 10-mesh screen |
| | Water-granulated aggregate | 25 | Passed through 8-mesh screen |
| | Crushed stone | 10 | Graded through 8-mesh and 25-mesh screens |
| | Pottery dust | 15 | Graded through 8-mesh and 25-mesh screens |
| Fine Powdery Material | High-molecular ashes obtained by burning sludge | 40 | |
| | Gairome clay | 10 | Contained in a slurry, together with 15 parts of water and 0.1 part of defloccu-lant |
| | Sludge obtained from sewage in a factory (chiefly containing waste frit) | 3 | |
| | High-molecular ashes obtained by burning sludge | 2 | |

Using a friction molding machie, some of the bodies obtained as mentioned above were each molded, under a pressure of 250 kg/cm$^2$, into an object with dimensions of 210 mm×110 mm×60 mm, while the other bodies were each molded, under the same pressure, into an object with dimensions of 300 mm×300 mm×60 mm. All moldings thus obtained were each fired for 22 hours through a tunnel kiln maintained at a temperature of 1,080° C., so that ceramics with characteristics shown in Table 7-2 were produced:

TABLE 7-2

| Characteristics | Values of Characteristics |
|---|---|
| 1. Coefficient of water permeability | 4 to 5 × 10$^{-2}$ cm/sec (based on JIS A 1218) |
| 2. Water-holding capacity | 8 to 11 1/m$^2$ |
| 3. Saturation coefficient | 0.2 to 0.4 |
| 4. Surface hardness | Mohs hardness of 6 |
| 5. Bulk specific gravity | 1.60 to 1.70 |
| 6. Cold resistance | Subjected to a temperature of −20° C. forty (40) times and presented no problems |
| 7. Bending strength | 40 kgf/cm$^2$ or more (based on JIS R 2213) |

It will be appreciated that the ceramics with the characteristics of Table 7-2 are suitable as water-permeable flooring materials (blocks of brick) used for construction of a road shared by pedestrians and vehicles.

EXAMPLE 8

Aggregate and fine powdery material as shown in Table 8-1 were mixed together while agitating them, and the mixture was dried and granulated. The grains obtained were sifted through a 6-mesh screen to provide a body. This process was repeated a number of times to provide a number of same bodies.

TABLE 8-1

| Ceramic Raw Materials Used | Ingredients of Each Material | Parts by weight | Remarks |
|---|---|---|---|
| Aggregate | Water-granulated aggregate | 30 | Passed through 8-mesh screen |
| | Crushed stone | 15 | Graded through 10-mesh and 25-mesh screens |
| | Pottery dust | 20 | Graded through 8-mesh and 25-mesh screens |
| Fine Powdery Material | High-molecular ashes obtained by burning sludge | 30 | |
| | Calcareous ashes obtained by burning sludge | 5 | |
| | Gairome clay | 13 | Contained in a slurry, together with 15 parts of water and 0.1 part of defloccu-lant |
| | Sludge obtained from sewage in a factory (chiefly containing waste frit) | 2 | |

Using a friction molding machine, some of the bodies obtained as mentioned above were each molded, under a pressure of 250 kg/cm$^2$, into an object with dimensions of 210 mm×110 mm×60 mm, while the other bodies were each molded, under the same pressure, into an object with dimensions of 300 mm×300 mm×60 mm. All moldings thus obtained were each fired for 22 hours in a tunnel kiln maintained at a temperature of 1,120° C., so that ceramics with characteristics shown in Table 8-2 were produced:

TABLE 8-2

| Characteristics | Values of Characteristics |
|---|---|
| 1. Coefficient of water permeability | 3 to 5 × $10^{-2}$ cm/sec (based on JIS A 1218) |
| 2. Water-holding capacity | 7 to 9 l/m$^2$ |
| 3. Saturation coefficient | 0.2 to 0.3 |
| 4. Surface hardness | Mohs hardness of 6 to 7 |
| 5. Bulk specific gravity | 1.55 to 1.65 |
| 6. Cold resistance | Subjected to a temperature of $-20°$ C. forty (40) times and presented no problems |
| 7. Bending strength | 50 kgf/cm$^2$ or more (based on JIS R 2213) |

It will be appreciated that the ceramics with the characteristics of Table 8-2 are suitable as water-permeable flooring materials (blocks of brick) used for construction of a road shared by pedestrians and vehicles.

EXAMPLE 9

Aggregate and fine powdery material as shown in Table 9-1 were mixed together while agitating them, and the mixture was dried and granulated. The grains obtained were graded by sifting a portion thereof through a 3-mesh screen and the other portion thereof through a 6-mesh screen, and the coarse particles and fine particles thus obtained were appropriately mixed together to provide a body. This process was repeated a number of times to provide a number of same bodies.

TABLE 9-1

| Ceramic Raw Materials Used | Ingredients of Each Material | Parts by weight | Remarks |
|---|---|---|---|
| Aggregate | Water-granulated aggregate | 30 | Passed through 8-mesh screen |
| | Crushed stone | 15 | Graded through 8-mesh and 25-mesh screens |
| | Pottery dust | 20 | Graded through 8-mesh and 25-mesh screens |
| Fine Powdery Materials | High-molecular ashes obtained by burning sludge | 30 | |
| | Calcareous ashes obtained by burning sludge | 5 | |
| | Gairome clay | 13 | Contained in a slurry, together with 15 parts of water and 0.1 part of defloccu-lant |
| | Sludge obtained from sewage in a factory (chiefly containing waste frit) | 2 | |

Using a friction molding machine, the bodies obtained as mentioned above were each molded, under a pressure of 250 kg/cm$^2$, into an object with dimensions of 210 mm×110 mm×60 mm. The molding thus obtained were each fired for 22 hours through a tunnel kiln maintained at a temperature of 1,120° C., so that ceramics with characteristics shown in Table 9-2 were produced:

TABLE 9-2

| Characteristics | Values of Characteristics |
|---|---|
| 1. Coefficient of water permeability | 5 to 7 × $10^{-2}$ cm/sec (based on JIS A 1218) |
| 2. Water-holding capacity | 6 to 9 l/m$^2$ |
| 3. Saturation coefficient | 0.2 to 0.3 |
| 4. Surface hardness | Mohs hardness of 6 to 7 |
| 5. Bulk specific gravity | 1.55 to 1.60 |
| 6. Cold resistance | Subjected to a temperature of $-20°$ C. forty (40) times and presented no problems |
| 7. Bending strength | 45 kgf/cm$^2$ or more (based on JIS R 2213) |

It will be appreciated that the ceramics with the characteristics of Table 9-2 are suitable as water-permeable flooring materials (blocks of brick) used for construction of a road shared by pedestrians and vehicles.

EXAMPLE 10

Aggregate and fine powdery material as shown in Table 10-1 were mixed together while agitating them, and the mixture was dried and granulated. The grains obtained were sifted through a 6-mesh screen to provide a body. This process was repeated a number of times to provide a number of same bodies.

TABLE 10-1

| Ceramic Raw Materials Used | Ingredients of Each Material | Parts by weight | Remarks |
|---|---|---|---|
| Aggregate | Water-granulated aggregate | 30 | Passed through 8-mesh screen |
| | Pumice | 15 | Passed through 10-mesh screen |
| | Pottery dust | 20 | Passed through 8-mesh screen |
| Fine Powdery Material | High-molecular ashes obtained by burning sludge | 25 | |
| | Calcareous ashes obtained by burning sludge | 10 | |
| | Organic binder | 0.1 | |
| | Gairome clay | 14 | Contained in a slurry, together with 15 parts of water and 0.1 part of defloccu-lant |
| | Sludge obtained from sewage in a factory (chiefly containing waste frit) | 1 | |

Using a hydraulic molding machine, the bodies obtained as mentioned above were each molded, under a pressure of 250 kg/cm$^2$, into an object with dimensions of 200 mm×200 mm×30 mm. The molding thus obtained were each fired for 80 minutes through a roller-hearth kiln maintained at a temperature of 1,200° C., so the ceramics with characteristics shown in Table 10-2 were produced:

TABLE 10-2

| Characteristics | Values of Characteristics |
|---|---|
| 1. Coefficient of water permeability | 4 to 6 × $10^{-2}$ cm/sec (based on JIS A 1218) |
| 2. Water-holding capacity | 3 to 4 l/m$^2$ |
| 3. Saturation coefficient | 0.2 to 0.3 |
| 4. Surface hardness | Mohs hardness of 6 to 7 |
| 5. Bulk specific gravity | 1.55 to 1.65 |
| 6. Cold resistance | Subjected to a temperature of $-20°$ C. forty (40) times and presented no problems |
| 7. Bending strength | 100 kgf/cm$^2$ or more (based on JIS R 2213) |

The ceramics produced are suitable as water-permeable flooring materials for a sidewalk, an open area in a city or town, or the like, owing to their shapes and characteristics of Table 10-2.

EXAMPLE 11

Aggregate and fine powdery material as shown in Table 11-1 were mixed together while agitating them, and the mixture was dried and granulated. The grains obtained were sifted through a 6-mesh screen to provide a body. This process was repeated a number of times to provide a number of same bodies.

TABLE 11-1

| Ceramic Raw Materials Used | Ingredients of Each Material | Parts by weight | Remarks |
|---|---|---|---|
| Aggregate | Water-granulated aggregate | 30 | Passed through 8-mesh screen |
|  | River-water granulated aggregate | 15 | Passed through 8-mesh screen |
|  | Pottery dust | 20 | Passed through 8-mesh screen |
| Fine Powdery Material | High-molecular ashes obtained by burning sludge | 25 |  |
|  | Calcareous ashes obtained by burning sludge | 10 |  |
|  | Organic binder | 0.1 |  |
|  | Gairome clay | 14 | Contained in a slurry, together with 15 parts of water and 0.1 part of defloccu-lant |
|  | Sludge obtained from sewage in a factory (chiefly containing waste frit) | 1 |  |

Using a hydraulic molding machine, the bodies obtained as mentioned above were each molded, under a pressure of 250 kg/cm$^2$, into an object with dimensions of 200 mm × 200 mm × 30 mm. The moldings thus obtained were each fired for 80 minutes through a roller-hearth kiln maintained at a temperature of 1,200° C., so that ceramics with characteristics shown in Table 11-2 were produced:

TABLE 11-2

| Characteristics | Values of Characteristics |
|---|---|
| 1. Coefficient of water permeability | 5 to 6 × $10^{-2}$ cm,/sec (based on JIS A 1218) |
| 2. Water-holding capacity | 3 to 4 l/m$^2$ |
| 3. Saturation coefficient | 0.2 to 0.3 |
| 4. Surface hardness | Mohs hardness of 6 to 7 |
| 5. Bulk specific gravity | 1.60 to 1.70 |
| 6. Cold resistance | Subjected to a temperature of $-20°$ C. forty (40) times and presented no problems |
| 7. Bending strength | 95 kgf/cm$^2$ or more (based on JIS R 2213) |

The ceramics produced are suitable as water-permeable flooring materials for a sidewalk, an open area in a city or town, or the like, owing to their shapes and characteristics of Table 11-2.

EXAMPLE 12

TABLE 12-1

| Ceramic Raw Materials Used | Ingredients of Each Material | Parts by Weight | Remarks |
|---|---|---|---|
| Aggregate | Pumice | 55 | Passed through 20-mesh screen |
| Fine Powdery Material | High-molecular ashes obtained by burning sludge | 35 |  |
|  | Raw kibushi clay | 10 | Contained in a slurry, together with 8 parts of water and 0.1 part of defloccu-lant |

Aggregate and fine powdery material as shown in Table 12-1 were mixed together while agitating them, to provide a body. This process was repeated a number of times to provide a number of same bodies. Using a hydraulic molding machine, the bodies thus obtained were each molded, under a pressure of 250 kg/cm$^2$, into an object with dimensions of 100 mm × 100 mm × 10 mm. The moldings thus obtained were each fired for 22 hours through a tunnel kiln maintained at a temperature of 1,080° C., so that ceramics with characteristics shown in Table 12-2 were produced:

TABLE 12-2

| Characteristics | Values of Characteristics |
|---|---|
| Water absorption | less than 1% (based on JIS A 5209) |
| Surface hardness | Mohs hardness of 7 |
| Wear resistance | 0.05 or less (based on JIS A 5209) [by sanding] |
| Cold resistance | Subjected to a temperature of $-20°$ C. forty (40) times and presented no problems |
| Bending strength | 250 to 300 kgf/cm$^2$ (based on JIS R 2213) |
| Skid resistance | 0.9 to 1.0 (based on JIS 1407) |

The ceramics with the characteristics of Table 12-2 are suitable as unglazed floor tiles and, in particular, excel the presently-available porcelains or stoneware in their values of skid resistance, 0.9 to 1.0.

EXAMPLE 13

TABLE 13-1

| Ceramic Raw Material Used | Ingredients of Material | Parts by Weight | Remarks |
| --- | --- | --- | --- |
| Fine Powdery Material | High-molecular ashes obtained by burning sludge | 20 | |
| | Dust of wall tile | 80 | Produced by dry grinding and collected with a dust collector during the molding process |

Four (4) to six (6) percent of water based on the total weight of the fine powdery material of Table 13-1 was added thereto, and the whole was mixed together while agitating it. The mixture was granulated to provide a body. This process was repeated a number of times to provide a number of same bodies. Using a hydraulic molding machine, the bodies were each molded, under a pressure of 250 kg/cm$^2$, into an object with dimensions of 100 mm×100 mm×5 mm. The moldings thus obtained were each fired for 45 minutes through a roller-hearth kiln maintained at a temperature of 1,200° C., so that ceramics with characteristics as shown in Table 13-2 were produced:

TABLE 13-2

| Characteristics | Values of Characteristics |
| --- | --- |
| Water absorption | less than 4% (based on JIS A 5209) |
| Saturation coefficient | less than 0.4 |
| Bending strength | 300 to 350 kgf/cm$^2$ (based on JIS R 2213) |
| Cold resistance | Subjected to a temperature of −20° C. forty (40) times presented no problems |

The ceramics with the characteristics of Table 13-2 may be glazed to provide tiles for exterior finish of buildings or to provide tiles for interior finish of buildings in cold districts.

EXAMPLE 14

TABLE 14-1

| Ceramic Raw Materials Used | Parts by Weight | Remarks |
| --- | --- | --- |
| High-molecular ashes obtained by burning sludge | 60 | |
| Gairome clay | 20 | |
| Waste wall tile | 20 | Waste of finished or half-finished tile |

The ceramic raw materials as shown in Table 14-1 and the same amount of water were mixed and crushed together for 2 hours in a ball mill, and the mixture was dried until its moisture content was reduced to about 6%. The mixture thus dried was sifted through a 20-mesh screen to provide a body. This process was repeated a number of times to provide a number of same bodies. Using a hydraulic molding machine, the bodies obtained were each molded, under a pressure of 250 kg/cm$^2$, into an object with dimensions of 100 mm×100 mm×10 mm. The moldings thus obtained were each fired for 22 hours through a tunnel kiln maintained at a temperature of 1,080° C., so that ceramics with characteristics as shown in Table 14-2 were produced:

TABLE 14-2

| Characteristics | Values of Characteristics |
| --- | --- |
| Water absorption | 0.1% or less (based on JIS A 5209) |
| Surface hardness | Mohs hardness of 7 |
| Wear resistance | 0.05 or less (based on JIS A 5209) [by sanding] |
| Cold resistance | Subjected to a temperature of −20° C. forty (40) times and presented no problems |
| Bending strength | 420 to 450 kgf/cm$^2$ (based on JIS R 2213) |
| Skid resistance | 0.4 to 0.5 (based on JIS A 1407) |

The ceramics with the characteristics of Table 14-2 are suitable as unglazed tiles for exterior finish of buildings or as unglazed floor tiles.

EXAMPLE 15

TABLE 15-1

| Ceramic Raw Materials Used | Parts by Weight | Remarks |
| --- | --- | --- |
| High-molecular ashes obtained by burning sludge | 35 | |
| Gairome clay | 5 | |
| Dust of wall tile | 60 | Produced by dry grinding and collected with a dust collector during the molding process |

The ceramic raw materials as shown in Table 15-1 and the same amount of water were mixed and crushed together for 2 hours in a ball mill, and the mixture was dried until its moisture content was reduced to about 6%. The mixture thus dried was sifted through a 20-mesh screen to provide a body. This process was repeated a number of times to provide a number of same bodies. Using a hydraulic molding machine, the bodies obtained were each molded, under a pressure of 250 kg/cm$^2$, into an object with dimensions of 100 mm×100 mm×5 mm. The moldings thus obtained were each dried until their moisture contents were reduced to 2% or less. A frit was applied to each dried molding, which was then fired for 40 minutes through a roller-hearth kiln maintained at a temperature of 1,100° C., so that ceramics with characteristics as shown in Table 15-2 were produced:

TABLE 15-2

| Characteristics | Values of Characteristics |
| --- | --- |
| Shrinkage | 6.0 to 6.5% |
| Water absorption | 10 to 12% (based on JIS A 5209) |
| Saturation coefficient | 0.55 to 0.60 |
| Bending strength | 320 to 350 kgf/cm$^2$ (based on JIS R 2213) of −20° C. forty (40) times |
| Cold resistance | Subjected to a temperature of −20° C. forty (40) times and presented no problems |

The ceramics with the characteristics of Table 14-2 are suitable as glazed tiles for interior finish of buildings.

EXAMPLE 16

TABLE 16-1

| Ceramic Raw Materials Used | Parts by Weight | Remarks |
| --- | --- | --- |
| High-molecular ashes obtained by burning sludge | 15 | |
| Gairome clay | 5 | |
| Dust of wall tile | 80 | Produced by dry grinding and collected with a dust collector during the molding process |

The ceramic raw materials as shown in Table 16-1 and the same amount of water were mixed and crushed together for 2 hours in a ball mill, and the mixture was dried until its moisture content was reduced to about 6%. The mixture thus dried was sifted through a 20-mesh screen to provide a body. This process was repeated a number of times to provide a number of same bodies. Using a hydraulic molding machine, the bodies obtained were each molded, under a pressure of 250 kg/cm², into an object with dimensions of 100 mm × 100 mm × 5 mm. The moldings thus obtained were each fired for 45 minutes through a roller-hearth kiln maintained at a temperature of 1,180° C., so that ceramics with characteristics as shown in Table 16-2 were produced:

TABLE 16-2

| Characteristics | Values of Characteristics |
| --- | --- |
| Water absorption | 0.1% (based on JIS A 5209) |
| Surface hardness | Mohs hardness of 7 to 8 |
| Wear resistance | 0.03 or less (based on JIS A 5209) [by sanding] |
| Bending strength | 700 to 730 kgf/cm² (based on JIS R 2213) |
| Skid resistance | 0.4 to 0.5 (based on JIS A 1407) |

The ceramics with the characteristics of Table 16-2 are most suitable as unglazed tiles for exterior finish of buildings or as unglazed floor tiles. If desired, however, a frit may be applied to such ceramics to provide glazed tiles for exterior finish of buildings or glazed floor tiles.

EXAMPLE 17

Aggregate and fine powdery material as shown in Table 17-1 were mixed together while agitating them, and the mixture was dried and granulated. The grains obtained were sifted through a 6-mesh screen to provide a body. This process was repeated a number of times to prepare a number of same bodies.

TABLE 17-1

| Ceramic Raw Materials Used | Ingredients of Each Material | Parts by Weight | Remarks |
| --- | --- | --- | --- |
| Aggregate | Water-granulated aggregate | 20 | Passed through 10-mesh screen |
| | Pumice | 15 | Passed through 8-mesh screen |
| | Pottery dust | 30 | Graded through 8-mesh and 25-mesh screens |
| Fine Powdery Material | Sludge obtained from sewage in a factory (chiefly containing waste frit) | 35 | Powdery sludge obtained by drying and grinding the sludge and sifting the grains through 60-mesh screen |
| | Gairome clay | 12 | Contained in a slurry, together with 15 parts of water and 0.1 part of defloccu- lant |
| | Sludge obtained from sewage in a factory (chiefly containing waste frit) | 3 | |
| | Pigment for pottery | 1.5 | |

The body prepared in accordance with the Example 4 was supplied into the die of a friction molding machine by the amount of from 4/6 (four sixths) to 5/6 (five sixths) of the total volume of the die, and then, the above-mentioned body of the present Example 17 was supplied thereinto over the body of the Example 4 by the amount of from 2/6 (two sixths) to 1/6 (one sixth) of the total volume of the die, and the whole was molded, under a pressure of 250 kg/cm², into an object with dimensions of 200 mm × 100 mm × 60 mm. This process was carried out for each of the above-mentioned bodies of the present Example, so as to provide a number of moldings with the same dimensions. Then, the moldings thus obtained were each fired for 22 hours through a tunnel kiln maintained at a temperature of 1,100° C., so that ceramics with characteristics as shown in table 17-2 were produced:

TABLE 17-2

| Characteristics | Values of Characteristics |
| --- | --- |
| 1. Coefficient of water permeability | 3 to 5 × 10⁻² cm/sec (based on JIS A 1218) |
| 2. Water-holding capacity | 8 to 10 l/m² |
| 3. Saturation coefficient | 0.2 to 0.3 |
| 4. Surface hardness | Mohs hardness of 6 to 7 |
| 5. Bulk specific gravity | 1.60 to 1.65 |
| 6. Cold resistance | Subjected to a temperature of −20° C. forty (40) times and presented no problems |
| 7. Bending strength | 55 kgf/cm² or more (based on JIS R 2213) |

In most cases ceramic products containing the ashes obtained by burning sludge are reddish or blackish brown in color. The ceramic product containing such ashes according to the invention, however, can be colored as desired at its surface. Therefore, for example, the water-permeable flooring material (brick block) containing such ashes according to the invention may be colored, as a paving material, to match the environment in which it is to be used, such as a sidewalk or a park.

It largely depends upon the paving method whether the water-permeable flooring material produced according to the invention can be effectively used. So, preferred examples of the paving method using the water-permeable flooring material will now be described with reference to FIGS. 1 to 3.

Figure 2:
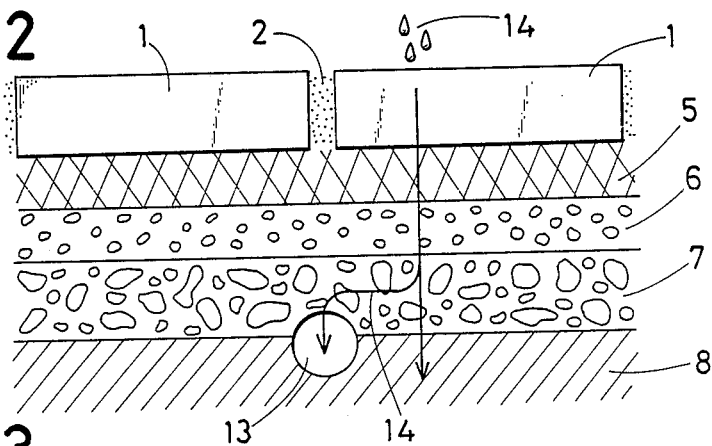
Figure 3:
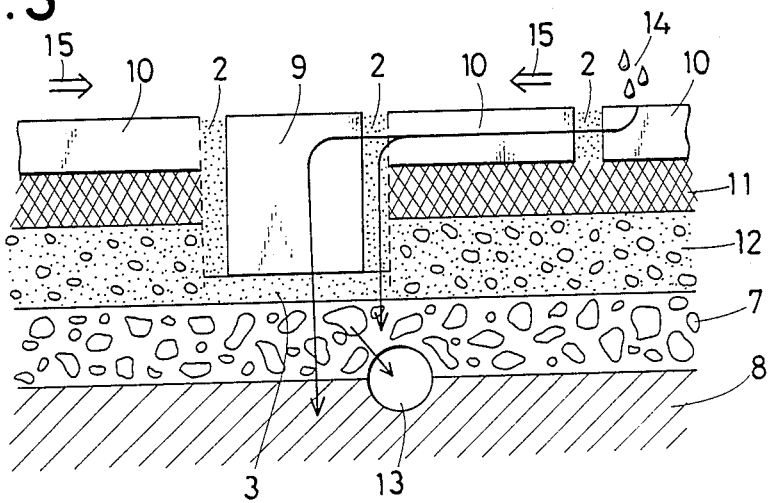

FIGS. 1 to 3 each illustrate a vertical cross section of a road. FIG. 1 illustrates quite a common paving method similar to the interlock-type method, as well as the most easy method of paving a road with the water-permeable flooring material with a thickness of 60 mm or more. In FIG. 1, numeral 1 designates water-permeable flooring materials (with a thickness of 60 mm or more) produced according to the invention. Numeral 2 designates a joint with a width of about 3 to 10 mm, located between the flooring materials 1. (It is most often that the joint 2 consists of sand with relatively uniform particle sizes.) The joint 2 not only has a water permeability, but also functions to lock the flooring materials 1 (i.e., prevents the materials 1 from being displaced. Numeral 3 designates a cushion layer with a thickness of 20 to 30 mm (although this thickness may be up to 50 mm if a sidewalk is to be paved) which consists of coarse sand. Below the cushion layer 3 is provided a crusher-run layer 7 (which preferably should be coarse crushed stone containing only the least amount of extraneous soil or dust, if any). The crusher-run layer 7 is separated from the cushion layer 3 by a nonwoven fabric 4 which prevents the sand from flowing into the crusher-run layer 7. The crusher-run layer 7 has a thickness determined not only in accordance with the condition of a roadbed 8, but also to meet the expected maximum load which will pass on the road.

If it rains onto the road, the rainwater will flow through the water-permeable flooring materials 1 or the joint 2, the cushion layer 3, the nonwoven fabric 4, and the crusher-run layer 7, to reach the roadbed 8. For example, the rainwater may flow straight to the roadbed 8, as indicated by an arrow 14. And the rainwater will flow through the roadbed 8, to be absorbed by the soil. If required to provide for heavy rains, water-permeable pipes such as one designated by numeral 13 may be disposed at suitable intervals in the roadbed 8 or the crusher-run layer 7, so as to receive the portion of the heavy rain beyond the capacity of absorption of the soil and lead it to a gutter or a water-permeable layer.

FIG. 2 illustrates a preferred method of paving a road with the water-permeable flooring material having a thickness of over 40 to less than 60 mm. The method of FIG. 2 features the use of (water-permeable) mortar on which to bond and fix the flooring material in order to prevent it from being severely damaged or displaced by relatively-large loads which will pass on the road. In FIG. 2, numeral 1 designates water-permeable flooring materials produced according to the invention. Numeral 2 designates a joint. Numeral 5 designates an about 20-mm thick, water-permeable mortar layer containing coarse sand (#3 or 4 silica sand) and cement in a weight ratio of about 6:1 to 8:1. This weight ratio of the sand and the cement is determined on the basis of the particle sizes of the sand and the amount of water used. The water-permeable flooring materials 1 are bonded to the water-permeable mortar layer 5. Under the mortar layer 5 is provided a layer of graded crushed stone 6 (with particle sizes ranging from about 2 mm to about 25 mm) prepared by kneading graded crushed stone and cement in a ratio of about 5:1 by the use of water. The layer of graded crushed stone 6 functions not only to reinforce both flooring materials 1 and mortar 5, but also to increase the water permeability and water-holding capacity of the road.

The construction of FIG. 2 allows the water-permeable flooring materials 1 with a medium or relatively-small thickness to withstand a relatively large load without being displaced thereby. If it rains on the road, the rainwater may flow straight to the roadbed 8 as in the case of the construction of FIG. 1. Also as in the case of the construction of FIG. 1, a water-permeable pipe 13 may be provided if required for the same purpose as in the construction of FIG. 1.

FIG. 3 illustrates a preferred method of paving a road with the water-permeable flooring material with a thickness of 40 mm or less. For the method of FIG. 3, the water-permeable flooring materials each having a relatively-large dimensions such as 300 mm×300 mm×30 mm may be used in conjunction with a block of brick or similar material which has a high coefficient of water permeability ($5 \times 10^{-2}$ cc/sec or more) and a thickness of 60 to 100 mm, a width of $\phi$to 200 mm and a length of 200 to 200 to 400 mm (although the various dimensions for the method of FIG. 3 are not limited to the above-mentioned particular values). Also the method of FIG. 3 features the use of a concrete layer between a crusher-run and a bonding mortar to prevent the flooring materials from being severely damaged by the loads passing on the road. Rainwater will flow through the permeable block to reach the roadbed.

In FIG. 3, numerals 9, 10 and 2 designate a water-permeable block of brick or similar material, water-permeable flooring materials produced according to the invention, and a joint with a width of about 2 to 5 mm, respectively. Under the flooring materials 10 is provided a bonding mortar 11 prepared by kneading sand and cement in a ratio of 3:1 to 5:1 (, which ratio is selected to provide a high degree of bonding of the mortar 11 to an under layer) by the use of a suitable amount of water. (The bonding mortar 11 may or may not be water permeable). Numerals 12, 3, 7 and 8 designate a common kind of concrete, a cushion layer, a crusher-run layer, and a roadbed, respectively.

The method of FIG. 3 is carried out as follows: To start with, the cushion layer 3 is made on the crusher-run layer 7 and the water-permeable block 9 is placed on the cushion layer 3, according to the distribution map. Then, the concrete 12 is so placed on the crusher-run layer 7 that spaces for the joint 2 will be left between the block 9 and the concrete 12. The bonding mortar 11 is applied on the concrete 12, and the water-permeable flooring materials 10 are bonded to the mortar 11 in such a manner that the materials 10 will be flush with the block 9. Finally, either coarse sand or #3, 4 or 5 silica sand is filled into the foregoing spaces, so as to provide joints 2.

If it rains on the road, the rainwater may, for example as indicated by an arrow 14, enter and flow through the flooring material 10 and flow through the adjacent joint 2 and another flooring material 10 toward the water-permeable block 9, and then flow partly through another joint 2 and partly through the water-permeable block 9 to come into the the crusher-run layer 7 and reach the roadbed 13.

In actual pavement of a road, if desired, a number of blocks 9 may be arranged crosswise for an aesthetic effect. Also, as in the case of the construction of FIG. 1 or 2, a water-permeable pipe 13 may be provided in the roadbed or the crusher-run layer if required for the same purpose as in the preceding construction.

Utility for the Industry

As described before, according to the invention, the sludge obtained by sewage treatment is used, together with a plastic raw ceramic material or materials, to produce ceramics. Therefore, the invention enables the production of ceramics at a low materials cost, thus providing low-priced ceramics.

Also, as described before, although the sludge is used for the invention, the product will not emit an offensive odor, nor be decomposed since the ceramic mix containing the sludge is fired in the final process (firing process). This advantage of the invention not only enables the production of ceramics of satisfactory quality, but also makes unnecessary the burning of the sludge to eliminate its odor and decomposition as required heretofore, thus eliminating the personnel expenses and fuel cost therefor.

Also as mentioned before, according to the invention, the sludge may be burned to ashes to be mixed with a plastic raw ceramic material or materials. This feature of the invention allows the production of ceramics in an agreeable environment with no offensive odor, as well as the production of ceramics with no such odor.

Moreover, according to the invention, a slurry containing clay may be added to a material prepared by mixing the ashes of the sludge with a plastic ceramic raw material or materials in a dry process. Then, the slurry may act as a binder to moisten and granulate the mixture, thus providing a highly moldable body. Also, since the slurry is added to the dry-process mixed material, the body thus obtained has only a very small amount of moisture; therefore, a time-consuming and elaborate drying process as required if a wet-process mixing is used is no longer needed and, hence, the total cost required for production of ceramics may be reduced.

Furthermore, according to the invention, a ceramic with a desired characteristic in respect of water permeability, from almost no permeability to a very high permeability, may be produced for the particular application by suitably selecting the kind, amount and particle size of aggregate used, the amount of sludge used, particle size of the body, the molding pressure, the firing temperature, and the like.

What is claimed is:

1. A process for producing ceramic products comprising the steps of (a) mixing together at least ashes prepared by burning a sludge obtained by sewage treatment and a plastic ceramic raw material to prepare a moldable body; (b) molding the body into a desired shape; and (c) firing the molded body.

2. The process of claim 1 whereina the mixing of said ashes and said plastic ceramic raw material is conducted as a dry process.

3. The process of producing ceramic products in accordance with claim 1 wherein the mixing of said ashes and said plastic ceramic raw material is conducted as a wet process.

4. The process of claim 2 further comprising the step of mixing a powdery aggregate with said sludge and said plastic ceramic raw material to prepare a moldable body.

5. A process for producing ceramic products comprising the steps of (a) mixing together, in a dry process, at least ashes prepared by burning a sludge obtained by sewage treatment, and a powdery ceramic raw material; (b) adding a slurry containing clay to the mixtue obtained by said dry-process mixing so as to provide a moldable body; (c) molding the body into a desired shape; and (d) firing the molded body.

6. The process of claim 5 further comprising the step of mixing a powdery aggregate with either said ashes and said cermaic raw material.

* * * * *

UNITED STATES PATENT AND TRADEMARK OFFICE
CERTIFICATE OF CORRECTION

PATENT NO. : 4,874,153
DATED : October 17, 1989
INVENTOR(S) : Hashimoto et al.

It is certified that error appears in the above-identified patent and that said Letters Patent is hereby corrected as shown below:

At Column 14, line 4 delete "cm,/sec" and insert --cm/sec--.

At Column 20, line 26 delete "$\phi$to 200 mm" and insert --100 to 200 mm--.

At Column 22, line 18 delete "whereina" and insert --wherein--.

At Column 22, line 34 delete "mixtue" and insert --mixture--.

Signed and Sealed this

Twenty-eighth Day of January, 1992

Attest:

HARRY F. MANBECK, JR.

*Attesting Officer*  *Commissioner of Patents and Trademarks*